(12) United States Patent
Slavik

(10) Patent No.: US 12,718,698 B2
(45) Date of Patent: Aug. 25, 2026

(54) APPLICATION BASED AIR TRAFFIC CONTROL MANAGEMENT COMMUNICATION

(71) Applicant: Rohde & Schwarz GmbH & Co. KG, Munich (DE)

(72) Inventor: Jindrich Slavik, Freising (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 400 days.

(21) Appl. No.: 18/192,129

(22) Filed: Mar. 29, 2023

(65) Prior Publication Data

US 2023/0316929 A1 Oct. 5, 2023

(30) Foreign Application Priority Data

Mar. 30, 2022 (EP) .................................... 22165307

(51) Int. Cl.
*G08G 5/26* (2025.01)
*H04W 4/02* (2018.01)
(Continued)

(52) U.S. Cl.
CPC .............. *G08G 5/26* (2025.01); *H04W 4/025* (2013.01); *H04W 4/40* (2018.02); *H04W 76/14* (2018.02)

(58) Field of Classification Search
None
See application file for complete search history.

(56) References Cited

U.S. PATENT DOCUMENTS 6,185,430 B1 * 2/2001 Yee .................... H04B 7/18508 455/430
2006/0046715 A1 3/2006 Burgemeister
(Continued)

FOREIGN PATENT DOCUMENTS

EP 3671386 A1 * 6/2020 ............ H04W 24/04
EP 3882888 A1 * 9/2021 ............... G08G 5/22
EP 3908030 A1 * 11/2021 ............... G08G 5/22

OTHER PUBLICATIONS

Bauer et al., "A Survey of Protocols to Support IP Mobility in Aeronautical Communications," 2011, IEEE Communications Surveys & Tutorials, vol. 13, No. 4, Fourth Quarter 2011, pp. 642-657 (Year: 2011).*

(Continued)

*Primary Examiner* — Madison R. Inserra
(74) *Attorney, Agent, or Firm* — Westman, Champlin & Koehler, P.A.

(57) ABSTRACT

A mobile device on which an application software or application program is installed and working for performing a registration process to a registration server for an integration of the mobile device into an air traffic control (ATC) voice environment. The application software can subsequently be launched on the mobile device to establish a connection via IP (for instance 4G/5G) to the network of an Air Navigation Service Provider (ANSP). Based on a geolocation information provided to the application, the application connects the mobile device to an IT system (radio server) managing a proper communication frequency. This allows the user to receive every VHF transmissions on his mobile phone using the VHF ground based receivers of the ANSP. Once the user wants to transmit, he can press a push-to-talk (PTT) button on the interface of the application on the mobile device.

5 Claims, 3 Drawing Sheets

(51) Int. Cl.

| | |
|---|---|
| ***H04W 4/40*** | (2018.01) |
| ***H04W 76/14*** | (2018.01) |

(56) References Cited

U.S. PATENT DOCUMENTS

| | | | | |
|---|---|---|---|---|
| 2016/0111007 | A1* | 4/2016 | Dennerline | G08G 5/26<br>701/528 |
| 2017/0293867 | A1 | 10/2017 | Casado et al. | |
| 2021/0037081 | A1* | 2/2021 | Slavik | H04L 41/0631 |
| 2021/0343155 | A1* | 11/2021 | Lautenbacher | H04W 72/54 |
| 2024/0363010 | A1* | 10/2024 | Pierce | G08G 5/26 |

OTHER PUBLICATIONS

Extended European search report for European Patent Application No. 22165307.4, dated Mar. 16, 2023, 21 pages.

"Smartphone radios—the best of 2 worlds", Mehner.info, Website, Retrieved from: https://www.mehner.info/smartphones-handys-mit-funk/, Mar. 20, 2018, 6 pages.

Kampichler Wolfgang et al.: "Location based communication services for UAS in the NAS", 2016 IEEE/AIAA 35th Digital Avionics Systems Conference (DASC), IEEE Sep. 25, 2016 (Sep. 25, 2016), pp. 1-7, XP033019300.

Rohde & Schwarz Gmbh & Co. Kg: "Solutions for Aviation", Jun. 1, 2019 (Jun. 1, 2019), pp. 1-87, XP055807808.

* cited by examiner

APPLICATION BASED AIR TRAFFIC CONTROL MANAGEMENT COMMUNICATION

CROSS-REFERENCE TO RELATED APPLICATION

This application claims priority to European Patent Application No. 22165307.4, filed Mar. 30, 2022, the content of which is incorporated by reference in its entirety.

FIELD OF INVENTION

The present invention relates to an air traffic control system for air traffic control. More particularly, it relates to air traffic management communications, and more precisely to an application based (App-based) air traffic control management communication. It discloses a method for running a communication server in an Air Traffic Control, ATC, system to allow the use a mobile device e.g. smart phone or tablet for Air Traffic Control, ATC, communications within a cockpit of an aircraft, a method for using a mobile device for ATC communications within a cockpit of an aircraft, software programs and computer storages comprising instructions thereof, a computer server for use in an ATC system to allow the use a mobile device for ATC communications within a cockpit of an aircraft, a mobile device to be used for ATC communications within a cockpit of an aircraft and a system for using a mobile device for ATC communication in a cockpit of an aircraft.

TECHNICAL BACKGROUND

Air traffic control systems (ATC systems) are used for air traffic control or for monitoring flight/airspace areas. For this purpose, the ATC systems usually comprise several air traffic controller workstations from which air traffic controllers can communicate with other participants to an ATC system and receive, among other things, communication and/or information regarding the aircrafts in the airspace in order to be able to control the airspace or direct the aircraft therein.

Currently every user of a controlled airspace must be a participant to an ATC system and have to be equipped with air traffic control (ATC) radios for this purpose. The user of such ATC radios enters a radio frequency (VHF radio frequency) corresponding to the area of the airspace he/she is crossing such that he/she can participate to the communication between the participants of the ATC system in this area corresponding to the communication frequency (i.e. the pilot can receive every VHF transmission and send VHF transmission himself). The requirement of using such ATC radios also applies to users of small aircrafts and balloons. However, an ATC radio is often very costly, and can be a major expenditure item in the context of general or leisure aviation. Further, when used at low altitude, the reach and voice quality of existing ATC radios are rather low. In other words, this costly solution also entails rather low performance for the user of ATC radios in the above-mentioned field of general and leisure aviation. Finally, it is to be noted that these costly ATC radios also do not provide any security and additional information about the pilot and the aircraft (e.g. the aircraft's call sign, type of aircraft, travel plan, location or flight parameters, etc.).

SUMMARY

The teaching of the present invention aims at providing an easier and cheaper option for implementing the functions of ATC communication targeting preferably users in general or leisure aviation or air sports, such as the pilots of a small airplane, a balloon or the like. However, the solution proposed can also be used advantageously for any type of aircraft as it increases the security, audio quality and usability compared to existing solutions, especially for aircrafts close to the ground. An advantage of the proposed approach is also that the system is fully backwards compatible with the current environment (that is to say that it can be used with an older piece of hardware or software without special adaptation or modification) and can connect easily into existing ATC systems without any change to be performed by legacy users The system relies on a mobile device, such as a smart phone, a tablet or the like, on which an application software or application program is installed and running. For this purpose currently installed devices such as e.g. electronic flight bag (EFB) may be also used. From such a device, a registration process can be performed for registering to a registration server with the result of an integration of the device into an air traffic control (ATC) voice environment. Once the user (e.g. a pilot) get registered at a local air navigation service provider (ANSP), he gets his credentials to connect to the ATC voice system. When the user is about to start the airplane, he can then launch the application on the mobile device. The mobile device establishes a connection via IP (for instance 4G/5G), sat connection, or similar technologies to the network of the ANSP. Based on a geolocation information provided to the application by the mobile device, the system connects the mobile device to an IT system (radio server) managing a proper communication frequency for the position of the airplane. This allows the user to receive every VHF transmissions on his mobile phone using the VHF ground based receivers of the ANSP. Once the user wants to transmit, he can press a push-to-talk (PTT) button on the interface of the application on the mobile device. As a result, the communication is sent via voice over IP (VoIP) to the ANSP. From there, the communication can be forwarded to the ATC controller and can be simultaneously transmitted using the ATC ground infrastructure to all other participants in the ATC environment as if the pilot using the mobile device with the application was a normal or legacy user of the ATC system. Moreover, additional information can be provided to the controller and other participants such as the location of the calling aircraft (e.g. using geolocation function provided by the mobile device, such as GPS), as well as the name of the registered pilot, aircraft call sign, aircraft type, direction and heading of the aircraft (i.e. travel plan information or flight parameters).

This approach has several advantages. Firstly, because of its advantage in terms of cost compared to legacy solutions (VHF radios) it can significantly simplify the air traffic management and communication in the field of general and leisure aviation. Indeed, it can be advantageously used on small aircrafts or/and balloons for a much lower cost. Another advantage is that this solution can be easily used by legacy users for instance pilots of large aircrafts, which are by this means provided with a second communication means (therefore increasing the security and availability) without a dramatic increase of costs. Further also the audio quality is much better compared to legacy VHF environment, allowing clear better understanding between controller and pilot. It allows to transmit not only voice data but also many other data, for example about the identification or the flight, thus improving the safety of the air traffic in that the identification of the person who speaks on the frequency of communication and made in a more secure way. Finally, this solution has the great advantage of making the system fully backwards compatible with the current solution/environment.

The details of one or more embodiments are set forth in the accompanying drawings and the description below. Other features will be apparent from the description and drawings, and from the claims.

An aspect of the present invention relates to a method for running a communication server in an Air Traffic Control, ATC, system to allow the use of a mobile device for Air Traffic Control, ATC, communications within a cockpit of an aircraft, the method comprising the steps of: receiving, by the communication server from a registration server, registration information of a user of the mobile device for identification of the user to an Air Navigation Service Provider, ANSP; allowing, by the communication server, the mobile device to enter into communication with an ATC communication infrastructure based on the registration information of the user; using, by the communication server, a communication frequency appropriate to be used for communication in a section of the airspace corresponding to a geolocation of the aircraft to connect the mobile device to the ATC system; receiving, by the communication server through the ATC communication infrastructure, transmissions from one or more ATC controllers and/or from one or more other participants corresponding to the communication frequency used; sending, by the communication server to the mobile device, the transmissions from one or more ATC controllers and/or from one or more other participants corresponding to the communication frequency used. By this means, the user of a mobile device can have access to an ATC communication function without having to install a costly ATC radio.

In an embodiment of this aspect, the step of using the communication frequency appropriate to be used for communication in a section of the airspace corresponding to a geolocation of the aircraft to connect to the ATC system comprises: connecting, by the communication server, to the one or more other participants through one or more antennas of a ATC ground installation and/or to one or more controller working positions, CWP, of the one or more ATC controllers, wherein the one or more other participants and the one or more ATC controllers are connected in communication to the ATC system on the used communication frequency. By this means, all the participants to the ATC communication can be properly connected to the server.

In an embodiment of this aspect, the method further comprises the step of: receiving, by the communication server from the mobile device, a voice signal, and sending, by the communication server through the ATC communication infrastructure, the voice signal from the mobile device to the one or more CWP of the one or more ATC controllers and/or to the one or more other participants corresponding to the communication frequency used. This embodiment give more detail to an approach for data transfer from the mobile device to the ATC communication system.

In an embodiment of this aspect, the method further comprises: receiving, by the communication server from the mobile device, a geolocation information of the mobile device; determining, by the communication server, the appropriate radio frequency to be used for communication in the section of the airspace corresponding to the geolocation information. By this means, the frequency for the ATC communication is easily and automatically determine to correspond to the geolocation of the mobile device.

Another aspect of the present application relates to a method for using a mobile device for Air Traffic Control, ATC, communications within a cockpit of an aircraft, the method comprising the steps of: registering, by the mobile device to a registration server, a user of the mobile device for identification of the user to an Air Navigation Service Provider, ANSP; sending a request, by the mobile device to a communication device, to enter into communication with an ATC communication infrastructure based on the registration information of the user; sending, by the mobile device to the communication server, a communication frequency inputted by the user into a user interface of the mobile device or a geolocation information of the mobile device; receiving, by the mobile device from the communication server, transmissions of the ATC communication system from one or more ATC controllers and/or from one or more other participants corresponding to the communication frequency inputted or to a communication frequency appropriate to be used for communication in a section of the airspace corresponding to the geolocation information of the mobile device. By this means, the user of a mobile device can have access to an ATC communication function without having to install a costly ATC radio.

In an embodiment of this aspect, the method further comprises the step of sending, by the mobile device to the communication server, a voice signal by pressing a push-to-talk, PTT, button of the mobile device, wherein sending is done by VoIP communication. By this means, the user of the mobile can send voice transmission when needed into the ATC radio system.

In an embodiment of this aspect, the method further comprises: providing, by the mobile device, an analog connection to a radio in the cockpit of the aircraft of the user. By this means, the user can directly interact with a radio in the cockpit and can communicate with already installed means in the cockpit instead of continuing using the mobile device. Further, the voice connection in the cockpit can be of better quality.

In an embodiment of this aspect, the step of sending, by the mobile device to the communication server, a communication frequency inputted by the user into a user interface of the mobile device or a geolocation information of the mobile device is replaced by: determining, by the mobile device, a geolocation data of the mobile device; determining, by the mobile device, the appropriate radio frequency to be used for communication in the section of the airspace corresponding to the geolocation information; and sending, by the mobile device to the communication server, the determined communication frequency. By this means, the frequency for the ATC communication is easily and automatically determine to correspond to the geolocation of the mobile device.

Another aspect of the present invention relates to a software program, for running a communication server in an Air Traffic Control, ATC, system to allow the use a mobile device for Air Traffic Control, ATC, communications within a cockpit of an aircraft.

Another aspect of the present invention relates to a software program, for using a mobile device for Air Traffic Control, ATC, communications within a cockpit of an aircraft.

Another aspect of the present invention relates to a communication server for use in an Air Traffic Control, ATC, system to allow the use a mobile device for Air Traffic Control, ATC, communications within a cockpit of an aircraft, the communication server comprising: a receiving module, configured to receive from a registration server, registration information of a user of the mobile device for identification of the user to an Air Navigation Service Provider, ANSP; an allowing module, configured for allowing the mobile device to enter into communication with an ATC communication infrastructure based on the registration information of the user; a using module, configured for using a communication frequency appropriate to be used for communication in a section of the airspace corresponding to a geolocation of the aircraft to connect the mobile device to the ATC system; wherein the receiving module is further configured to receive through the ATC communication infrastructure, transmissions from one or more ATC controllers and/or from one or more other participants corresponding to the communication frequency used; a sending module configured for sending to the mobile device, the transmissions from one or more ATC controllers and/or from one or more other participants corresponding to the communication frequency used.

Another aspect of the present invention relates to a mobile device to be used for Air Traffic Control, ATC, communications within a cockpit of an aircraft, wherein the mobile device comprises: an audio interface; a display; a user interface; a communication interface; a processor; and a memory, storing a software program.

A last aspect of the present invention relates to a system for using a mobile device for Air Traffic Control, ATC, communication in a cockpit of an aircraft, comprising a mobile device according to an above-mentioned aspect of the present invention; a registration server; a communication server according to an above-mentioned aspect of the present invention; an ATC communication system in communication with the communication server, the ATC communication system comprising: one or more controller working position for an air traffic controller, one or more antennas of an ATC ground infrastructure for communication with ATC communication participant.

DETAILED DESCRIPTION OF THE EMBODIMENTS

Figure 1:
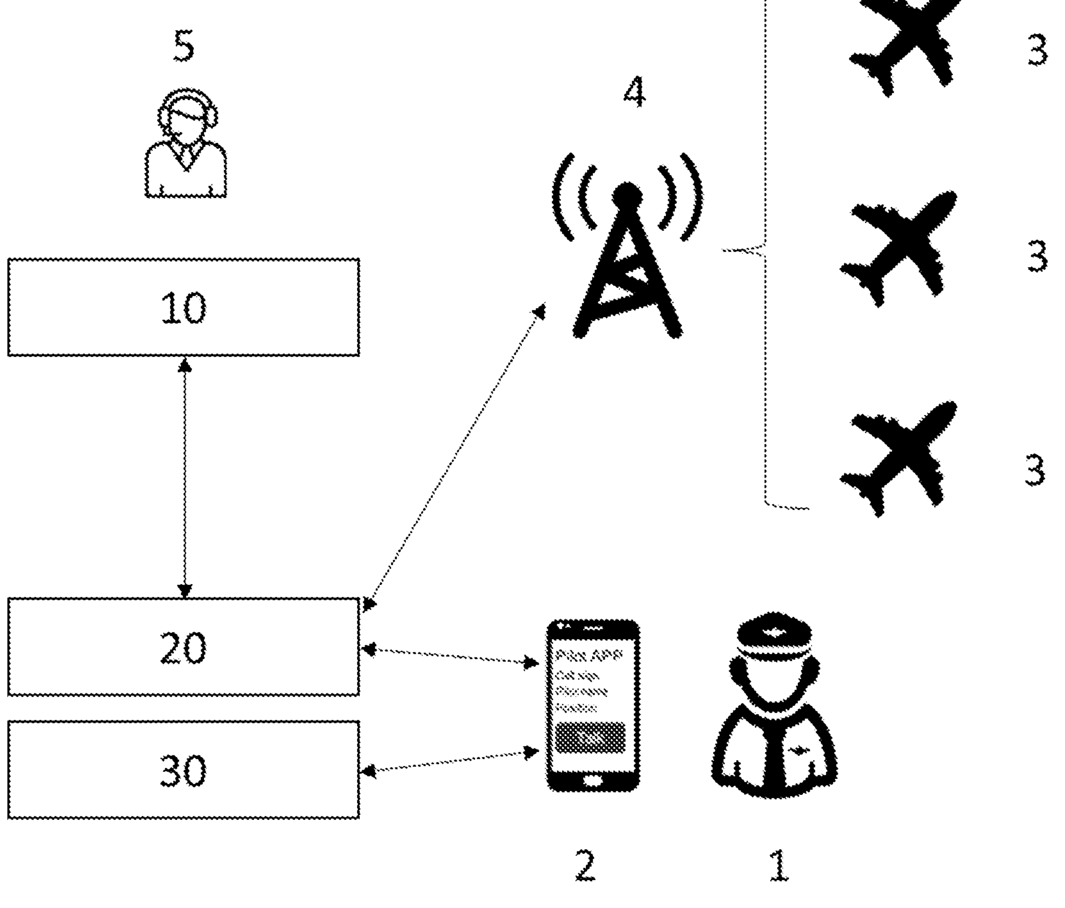
FIG. 1 is an ATC system according to one embodiment of the present invention.

Hereinafter, the embodiments will now be described in detail with reference to the accompanying drawings. However, the disclosure cannot be limited to the embodiment in which the idea of the disclosure is presented, and another embodiment included within the range of idea of another backward disclosure or the present disclosure may be easily proposed by addition, change, deletion and the like of another element.

The terms used in this specification were selected to include current, widely-used general terms. In certain cases, a term may be one that was arbitrarily established by the applicant. In such cases, the meaning of the term will be defined in the relevant portion of the detailed description. As such, the terms used in the specification are not to be defined simply by the name of the terms but are to be defined based on the meanings of the terms as well as the overall description of the present disclosure.

Hereinafter, embodiments of the present invention will be described in detail with reference to the accompanying drawings. It should be noted that the same reference numerals are used to designate the same or similar elements throughout the drawings.

FIG. 1 is a schema of an ATC system using an app-based solution according to the present application.

The system comprises a user 1, a mobile device 2, one or more aircrafts 3 participating to a controlled airspace, one or more antenna 4, one or more airspace controllers 5, one or more controller working positions (CWP) 10, a communication server 20 and a registration server 30.

The user 1 can be for instance the pilot of an aircraft which wants/needs to participate to the ATC communication of a controlled section of the airspace.

Figure 2:
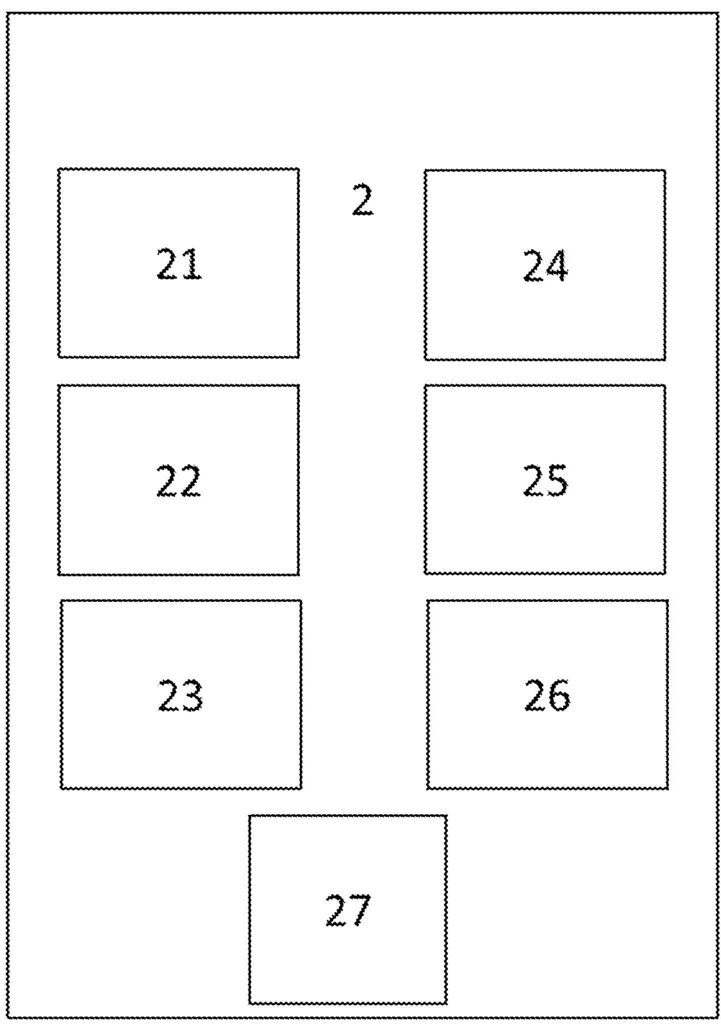
FIG. 2 is functional representation of a mobile device according to one embodiment of the present invention.

The user 1 can have a mobile device 2 as disclosed in FIG. 2. This device can be any kind of smartphone, tablet, laptop or the like, under the condition that it has a communication interface 24 to at least receive data on the transmissions from the ATC communication system and an audio interface 21 for outputting sounds corresponding to the received data from the ATC communication system. Advantageously, the mobile device 2 is also provided with a display 22, for displaying information to the user 1 and facilitating the use of the device in the framework of the ATC communication system, and a user interface 23, which can be operated by the user 1 to provide inputs. The user interface 23 can be separated from the display 22 or advantageously the display 22 can be a touch display thus merging the user interface and the display together. The mobile device 2 is equipped with a communication interface 24 which is configured to provide IP communications such 3G, 4G, 5G and/or the like. The mobile device 2 is equipped with a memory 25 to store data and a processor 26 to control the processing of the various elements comprised in the mobile device 2.

A software which can be in the form of an application program or APP can be installed on the mobile device 2. This APP can be installed into the memory 25 and can be operated by the processor 26. The user 1 can interact with the APP by means of the user interface 23, the display 22 and the audio interface 21. The APP can instruct the communication interface 24 to enter into communication with a registration server 30. To this means, the user can select the appropriate registration server 30, and input through the input interface the necessary registration information to register through the APP to the registration server 30 (e.g. a log-in to the service, with a password corresponding to his subscription).

Once registered to the registration server 30, the mobile device 2 can be integrated to the ATC voice environment of the ATC communication system, allowing the user 1 to register at the local ANSP and get his credentials to connect to the ATC voice system.

Upon starting his aircraft for instance, the user 1 can launch the APP on his mobile device 2. The mobile device 2 will then connect via IP (via e.g. 4G/5G, sat network) to the network of the ANSP by communicating with a communication server 20, under the condition that the registration process to the registration server has been performed and credentials to connect have been obtained. The registration server 30 can send the credentials of the user 1 to be verified at the moment of the connection to the communication server 20. It is to be noted that in the present example the two servers are separated but the registration and the communication servers could be the same. Advantageously, based on a geolocation information of the mobile device 2 (e.g. the mobile device can be provided with a geolocation module 27 such as a GPS module configured to determine this geolocation information), the APP connects the mobile device 2 with the appropriate communication server 20 managing a proper radio frequency, thus reducing potential cross talks. The radio frequencies correspond to the frequencies that need to be used for specific parts/sections of the airspace. For instance, in Civil Aviation these frequencies are selected in the VHF (very high frequency) radio spectrum. Some of them are used for air traffic control. But the teaching of the present application could be, of course, applied to other types of frequency spectrums, for instance to UHF radio spectrum that is used in military-based applications or HF spectrum used for oceanic flight. A possible way of implementing this automatic recognition of the frequency to be used with regard to the location of the aircraft is to have a correlation or correspondence table which links geolocations with communication frequencies. For instance, the geolocation parameters of an airspace section (e.g. its borders/limits or its points) can be linked to the VHF frequency that has been defined by the air traffic authorities for this airspace section. That is to say that the communication server 20 can be equipped with such a table which is stored in a memory such that the table can be called for determining the frequency corresponding to the geolocation data provided by the mobile device 2. Preferably, the correlation/correspondence table can be updated by the responsible of managing the communication server 20 for instance. The correlation/correspondence table could also be stored somewhere else and just accessed by the communication server 20 when needed. Alternatively, the mobile device 2 can store or access such a correlation/correspondence table, such that the mobile device 2 can determine the appropriate frequency and send it directly to the communication server 20. It is to be noted that the update of the table could also be done by air traffic authorities directly or by any other third party. Alternatively, the user can also enter directly in the interface of the App the communication frequency he wants to use.

One or more antennas 4 of the ATC system, such as one or more VHF antennas, can constitute the ATC ground infrastructure and can be in communication with the communication server 20 and with other participants 3 present in the same controlled airspace and participating in the ATC communication system using the same frequency.

The controller working position (CWP) 10 can be in communication with the communication server 20, such that an air traffic controller 5 can participate in the ATC communication system.

By means of the connection of the mobile device 2 to the communication server 20, the user 2 can receive every VHF transmissions of the airspace section corresponding to the frequency chosen on his mobile device 2 using the VHF ground-based receivers or antenna 4 of the ANSP. Indeed, the communication server 20 will ensure the communication connection with the ATC communication system for the mobile device 2. Once the user 1 is willing to transmit, he can for instance press a PTT button displayed by the APP on the display of the mobile device 2. As the PTT button is pushed, the communication is sent via VoIP to the communication server and from it to the ANSP. From there, the communication can be forwarded to the ATC controller 5 and simultaneously transmitted using the ATC ground infrastructure comprising the antennas 4 to all other participants 3. That is to say that the user 1 of the mobile device 2 on which the App is running will be put in the same situation as the other participants 3, in that he will hear all the transmissions on the selected communication frequency and his transmissions (when using the push-to-talk button) will be heard by all the other participants 3 and the air traffic controllers 5.

The App has the advantage that additional information can be provided to the controller 5 and other participants 3 beyond the voice transmission over the radio. For instance, location of the calling aircraft (using the GPS of the mobile phone) as well as the name of the registered pilot, the airplane call sign, the direction and heading of the airplane (i.e. information on the travel plan, flight parameters, etc.). This additional information can be displayed on the display of the mobile device 2 of the user, on other mobile devices 2 of other users 1, on the display of the CWPs 10 and/or on displays in the cockpits of the aircrafts of other participants 3. The display can be activated at the moment where a user is transmitting. For instance, a transmitting window showing the additional information of the user transmitting can be displayed on the above-mentioned displays during the transmission of the user.

This system significantly simplifies the air traffic management and communication for small aircrafts and balloons. Indeed, the use of the App is simple and intuitive for such less trained users. Further, it ensures that the integration of this solution into existing ATC system is fully backwards compatible with the current ATC environment.

Figure 3:
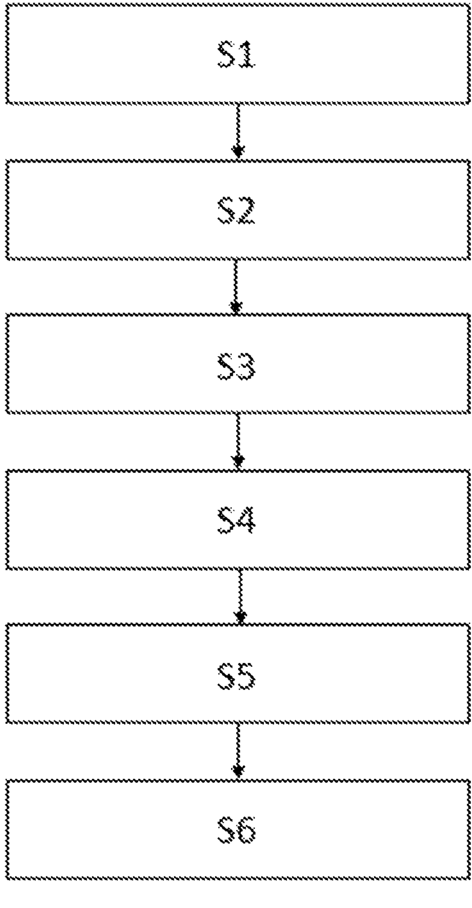
FIG. 3 is a process of using an app-based ATC system according to one embodiment of the present invention.

FIG. 3 is a flowchart of a method for using a mobile device 2 for ATC communication from the cockpit of a plane.

In step S1, the user 1 can install an APP for ATC management on a mobile device 2.

In step S2, the user can input registration information through a user interface 23 or on a touch display of the mobile device 2. This registration information can be sent by the mobile device 2 though its communication interface 24 to a registration server 30. The registration server 30 verifies the registration information provided by the mobile device 2 in order to identify the user 1 trying to connect his mobile device 2 through its APP. For instance, the registration server can offer a subscription to the ATC communication service and the user 1 can enter his identification information and payments details to register to the service. The registration server 30 can already have a list of logins, passwords and users data which is used to verify the registration information provided. The registration server 30 can transmit credentials to the mobile device 2 of the user 1 to be used for connecting to the communication server 20. The equivalent information to the credential can be sent by the registration sever 30 to the communication server 20 for being able to determine whether the mobile device 2 of the user 1 is to be authorized to be connected to the ATC communication system based on the registration.

In step S3, the mobile device 2 can enter into communication with an infrastructure that provides IP voice services. This step can comprise the step of entering into communication with a communication server 20 which is in communication with the ATC communication system, that is to say with one or more antenna 4 of the ground part of the ATC system and through them to one or more other participants 3 and/or to other users 1 of the App and/or to one or more controller working positions (CWP) 10 of one or more ATC controllers 5. Advantageously, this communication can be performed only once the step S2 of registration has been performed successfully, for instance using the credentials provided. For instance, the registration server 30 can communicate with the communication server 20 to inform which user login is accepted. This communication can further provide IP voice service from the mobile device 2 to a radio onboard the aircraft of the user 2, once the mobile device 2 is connected to the radio onboard the cockpit.

In step S4, a geolocation of the mobile device 2 of the user 1 is determined. For instance, using a geolocation module 27, such as a GPS module to obtain location (or geolocation) information of the mobile device 2. As the mobile device 2 is supposed to be in an aircraft during use, the location information of the mobile device 2 can be considered to be the same as the geolocation of the aircraft of the user 1. An appropriate frequency for communication to be used in the airspace section corresponding to the determine geolocation of the aircraft can be determined by the communication server 30 using the received geolocation information from the mobile device 2, as described above. For instance, using a correlation/correspondence table. Alternatively, this determination could be performed by the mobile device as explained above, or the frequency can be directly inputted by the user 1, without the use of any automatic determination based on the location information.

In step S5, the determined (or inputted) communication frequency is used to connect to the ATC system and to allow communication with the ATC controller 5 and other participants 3. Advantageously, the step can comprise outputting sounds of the transmissions from the other participants 3 and from the air traffic controller 5 by the audio interface 21 of the mobile device 2.

In step S6, a PTT button on the user interface 22 of the mobile device 2 can be pushed or touched to activate the transmission from the mobile device 2 to the ATC system, i.e. to the other participants 3 through the communication server 20 and the one or more antenna 5 and/or to the air traffic controller through the communication server. As a result, the voice of the user 1 in the cockpit of its aircraft can be transmitted (as the radio of the aircraft can be connected to the mobile device 2 at step S3). As a result, a voice signal will be sent via IP to the communication server and then to the ANSP, and from there to the ATC controller 5 or the other participants 3 via the analog ground infrastructure comprising the antennas 4.

The method described can be implemented in the form of software comprising instructions that cause microprocessors in the mobile device, in the registration server and in the communication server to perform the various steps described. The software can be saved in various parts on memories located in the mobile device, the registration server and in the communication server. The software can comprise different software interacting together, for instance one per type of device: one for the mobile device in the form of the APP, one for the registration server and one for the communication server.

What is claimed:

1. A method for running a communication server in an Air Traffic Control, ATC, system to allow the use of a mobile device with an app for Air Traffic Control, ATC, communications within a cockpit of an aircraft, the method comprising:

receiving, by the communication server from a registration server, registration information of a user of the mobile device for identification of the user of the mobile device to an Air Navigation Service Provider, ANSP;

allowing, by the communication server, the mobile device to enter into communication with an ATC communication infrastructure based on the registration information of the user of the mobile device and credentials from the mobile device to connect to the ATC system, wherein the communication server is configured to connect the mobile device to a network of the ANSP via internet protocol, IP, from which the communication with the ATC communication infrastructure is performed;

using, by the communication server, a communication frequency appropriate to be used for communication with the ATC communication infrastructure in a section of the airspace corresponding to a geolocation of the aircraft to connect the mobile device to the ATC system;

receiving, by the communication server through the ATC communication infrastructure, transmissions from one or more ATC controllers or from one or more other participants corresponding to the communication frequency used; and sending, by the communication server to the mobile device, the transmissions from one or more ATC controllers or from one or more other participants corresponding to the communication frequency used.

2. The method of claim 1, wherein the step of using the communication frequency appropriate to be used for communication in a section of the airspace corresponding to a geolocation of the aircraft to connect to the ATC system comprises:

connecting, by the communication server, to the one or more other participants through one or more antennas of an ATC ground installation or to one or more controller working positions, CWP, of the one or more ATC controllers, wherein the one or more other participants and the one or more ATC controllers are connected in communication to the ATC system on the used communication frequency.

3. The method of claim 1, further comprising the steps of:

receiving, by the communication server from the mobile device, a voice signal, and sending, by the communication server through the ATC communication infrastructure, the voice signal from the mobile device to the one or more CWP of the one or more ATC controllers or to the one or more other participants corresponding to the communication frequency used.

4. The method of claim 1, further comprising:

receiving, by the communication server from the mobile device, a geolocation information of the mobile device; and determining, by the communication server, the appropriate radio frequency to be used for communication in the section of the airspace corresponding to the geolocation information.

5. A communication server for use in an Air Traffic Control, ATC, system to allow the use of the user of the mobile device for Air Traffic Control, ATC, communications within a cockpit of an aircraft, the communication server comprising:

a receiving module, configured to receive from a registration server, registration information of a user of the mobile device for identification of the user to an Air Navigation Service Provider, ANSP;

an allowing module, configured for allowing the mobile device to enter into communication with an ATC communication infrastructure based on the registration information of the user and credentials from the mobile device to connect to the ATC system, wherein the communication server is further configured to connect the mobile device to a network of the ANSP via internet protocol, IP, from which the communication with the ATC communication infrastructure is performed;

a using module, configured for using a communication frequency appropriate to be used for communication with the ATC communication infrastructure in a section of the airspace corresponding to a geolocation of the aircraft to connect the mobile device to the ATC system;

wherein the receiving module is further configured to receive through the ATC communication infrastructure, transmissions from one or more ATC controllers or from one or more other participants corresponding to the communication frequency used; and a sending module configured for sending to the mobile device, the transmissions from one or more ATC controllers or from one or more other participants corresponding to the communication frequency used.

* * * * *